United States Patent [19]

Cherne et al.

[11] Patent Number: 4,871,898
[45] Date of Patent: Oct. 3, 1989

[54] CONSTANT ARC VOLTAGE GAS METAL ARC WELDING PROCESS

[75] Inventors: Lawrence Cherne, Hubertus, Wis.; Kevin A. Lyttle, Hopewell Junction, N.Y.

[73] Assignee: Union Carbide Corporation, Danbury, Conn.

[21] Appl. No.: 823,301

[22] Filed: Aug. 17, 1988

[51] Int. Cl.$^4$ .............................................. B23K 9/16
[52] U.S. Cl. .................................. 219/137 R; 219/74
[58] Field of Search ................ 219/74, 72, 136, 137 R

[56] References Cited

U.S. PATENT DOCUMENTS 3,139,503  6/1964  Freeman et al. ...................... 219/74
3,496,323  2/1970  Lesnewich et al. ................... 219/74
4,463,243  7/1984  Church ................................. 219/74
4,529,863  7/1985  Lebel ............................. 219/137.42
4,626,646  12/1986  Hilton ................................. 219/74
4,645,903  2/1987  DeVito ........................... 219/137 R
4,749,841  6/1988  Galantino et al. .................... 219/74

FOREIGN PATENT DOCUMENTS 448106  4/1975  U.S.S.R. ............................. 219/74

Primary Examiner—Clifford C. Shaw
Attorney, Agent, or Firm—Stanley Ktorides

[57] ABSTRACT

A gas metal arc welding process employing a shielding gas mixture consisting essentially of (A) 2 to 12 volume percent carbon dioxide, (B) 20 to 45 volume percent helium and (C) the balance argon.

10 Claims, 1 Drawing Sheet

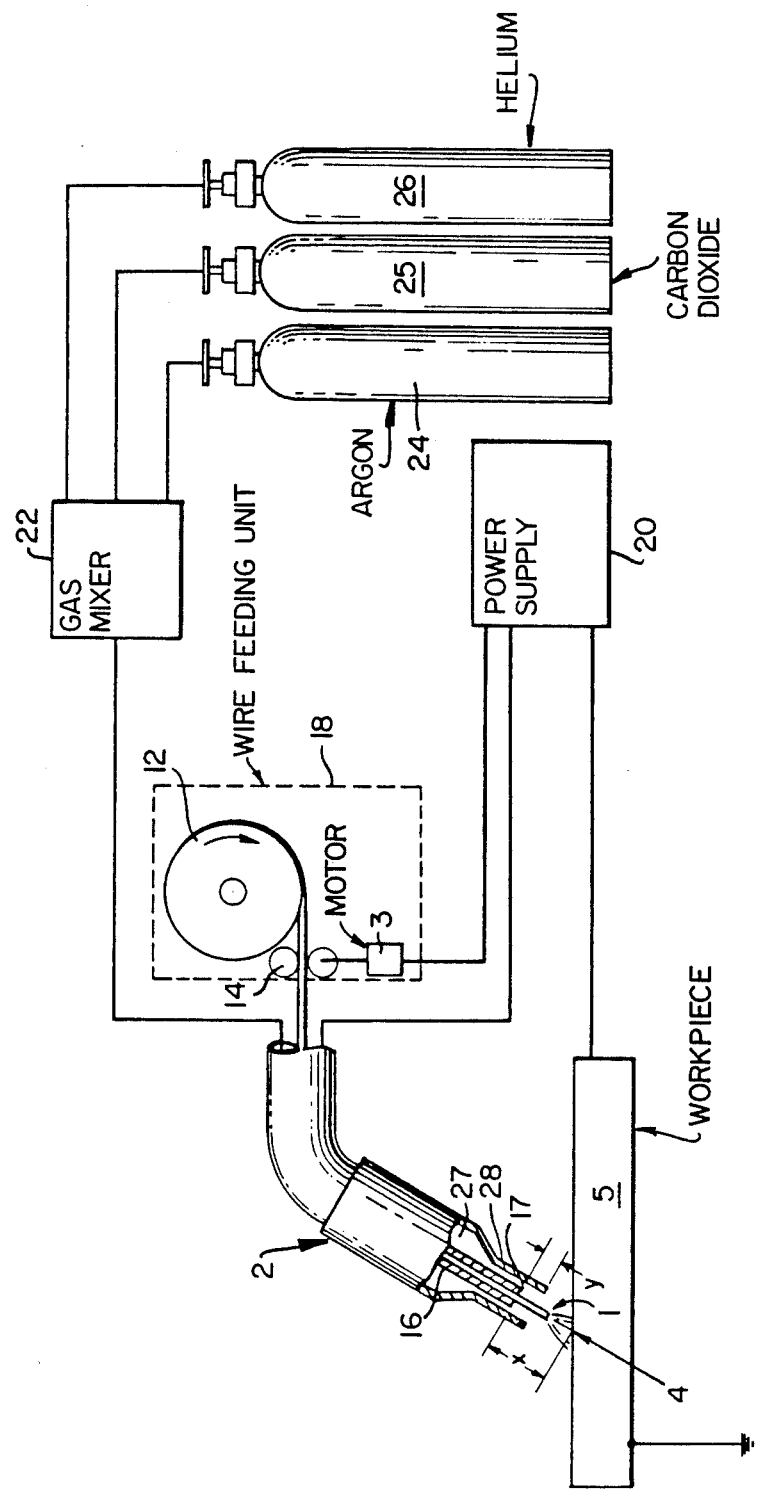

CONSTANT ARC VOLTAGE GAS METAL ARC WELDING PROCESS

TECHNICAL FIELD

This invention relates generally to gas metal arc welding with a consumable wire electrode and more particularly to an improved process for gas metal arc welding which can significantly increase the efficiency of welding carbon and alloy steels as well as the quality of the resulting welds.

BACKGROUND ART

Gas metal arc welding, commonly referred to as "GMAW" or "MIG" welding, is an electric arc welding process in which the arc is shielded from the ambient atmosphere by a gas or a mixture of gases. Metal is transferred to a workpiece through the arc from a consumable wire electrode. The consumable wire electrode is continuously fed into the arc at a preselected speed corresponding to a given deposition rate for a given wire size.

The optimum type of metal transfer employed with the gas metal arc process is a spray arc where fine metal droplets are transferred in a very controlled manner across the arc gap. Very little spatter is produced using this welding technique. The type of metal transfer can be obtained only with a certain combination of shielding gases and welding parameters and thus is generally produced only within a fairly narrow range of conditions.

Heretofore gas metal arc welding shielding gases have comprised solely carbon dioxide or have comprised mixtures of argon, oxygen, carbon dioxide or helium. Each heretofore known shielding gas has a specific known range within which the process with that gas will perform acceptably well. Helium, if employed in the gas mixture, is present in a concentration exceeding 50 percent and is used to impart special characteristics to the weld but only when its high cost can be justified.

While the use of the high cost helium shielding gas mixtures may be acceptable in the welding of certain specialty metals such as stainless steels, the cost of such gas mixtures is usually prohibitive for use in welding carbon or alloys steels.

Accordingly, it is an object of this invention to provide an improved gas metal arc welding process which can employ a shielding gas which does not require the presence of a large concentration of helium and yet achieves a comparable improvement in desired weld characteristics.

It is another object of this invention to provide an improved gas metal arc welding process which can employ a shielding gas which does not require the presence of oxygen.

It is yet another object of this invention to provide an improved gas metal arc welding process which can effectively weld carbon and low alloy steels at greater efficiency, and hence lower cost, than heretofore available processes.

SUMMARY OF THE INVENTION

The above and other objects which will become apparent to those skilled in the art upon a reading of this disclosure are attained by the present invention which is:

A process for gas metal arc welding with a consumable wire electrode comprising:
(a) forming an arc between said consumable wire electrode and a workpiece;
(b) maintaining a substantially constant arc voltage between said wire electrode and the workpiece;
(c) feeding the consumable wire electrode through a welding torch contact tube into said arc;
(d) transferring metal from the electrode to the workpiece; and
(e) shielding the arc with a gas mixture consisting essentially of:
   (A) 2 to 12 volume percent carbon dioxide;
   (B) 20 to 45 volume percent helium;
   (C) balance argon.

As used herein the term "carbon steel" means an alloy of iron and carbon wherein the carbon concentration generally does not exceed 0.5 percent, wherein manganese may be present in a concentration not exceeding 1.65 percent, wherein copper and silicon may be present in concentrations not exceeding 0.6 percent, and other alloy elements are generally not present except in residual amounts.

As used herein the term "alloy steel" means an alloy of iron and carbon wherein the carbon concentration generally does not exceed 0.5 percent, and which contains varying amounts of other elements such as manganese, silicon, nickel, chromium, molybdenum, copper, titanium and zirconium whose total concentration generally does not exceed 5 percent.

BRIEF DESCRIPTION OF THE DRAWINGS

The sole FIGURE is a schematic diagram of one system useful for carrying out the process of this invention.

DETAILED DESCRIPTION

The invention will be described in detail with reference to the Drawing.

Referring now to the FIGURE, consumable wire electrode 1 is drawn from reel 12 by feed roll 14 through contact tube 16 in gas shielded arc welding torch 2. The consumable wire electrode may have a diameter within the range of from 0.023 to 0.052 inch and may be composed of any suitable metal composition appropriate for the particular welding application. Examples of suitable metal compositions include any wires such as ER70S-3, -6-7, ER80S-D2 and ER100S-1 gas metal arc welding wires called out in American Welding Society Specifications A5.18 and A5.28.

Any suitable gas shielded torch may be used to carry out the process of this invention. One such suitable torch is the ST-16 torch which is commercially available from L-Tec Corporation. The torch may be either manually operated or mechanized. In the embodiment illustrated in the Figure, torch 2 is a mechanized torch. Feed roll 14 is driven by drive motor 3 contained in wire feeding unit 18 which can feed wire at the speeds necessary to achieve the desired deposition rates. One commercially available feeding unit is the "High Deposition" feeder manufactured by L-Tec Corporation which can feed wire up to 2000 inches per minute (ipm).

To assist in handling the inertia of a rotating wire package, it is desirable to employ a coasting braking system with an adaptive burnback circuit to prevent the wire from sticking to the contact tube upon termination of the welding operation.

Power supply 20 supplies power to both wire feeding unit 18 and torch 2. Power supply 20 is voltage controlled and of the constant potential type.

In operation an arc 4 is established between consumable electrode 1 and workpiece 5 by energizing power supply 20 and feeding the electrode into direct contact with the workpiece. The arc voltage between the electrode and the workpiece is kept substantially constant during the welding process. By "substantially constant" it is meant that the arc voltage varies not more then 5 percent from the setpoint during the welding process. The arc voltage setpoint is at a point where a stable spray arc is achieved. For example, for 0.023 inch diameter wire a stable spray arc is achieved with an arc voltage of between 22 and 30 volts, and for 0.035 to 0.052 inch diameter wire a stable spray arc is achieved with an arc voltage between 32 and 48 volts. The consumable wire electrode is fed through welding torch contact tube 16 into the arc and metal is transferred from the electrode to the workpiece.

The electrode 1 is fed through the contact tube 16 into the arc 4 formed between the electrode 1 and workpiece 5. Contact tube 16 is connected through torch 2 to power supply 20 for supplying power to electrode 1. Workpiece 5 is connected to round in common with the power supply ground. Preferably torch 2 is held above or at a distance from the workpiece 5 to assure an electrode extension or torch to work distance x. For a 0.023 inch diameter electrode the preferred electrode extension is within the range of from ⅜ to ¾ inch, most preferably about ⅝ inch, and for a 0.035 to 0.052 inch diameter electrode the preferred electrode extension is within the range of from ¾ to 1¼ inches, most preferably about 1 inch.

The arc is shielded from the ambient atmosphere by a gas mixture consisting essentially of:

(A) 2 to 12 volume percent carbon dioxide;
(B) 20 to 45 volume percent helium;
(C) balance argon.

Referring back now to the Figure, the shielding gas mixture useful with this invention is made up within gas mixer 22 which receives the component gases from cylinders 24, 25, and 26. For example cylinder 24 may contain argon, cylinder 25 may contain carbon dioxide and cylinder 26 may contain helium. Any other suitable gas storage container, such as a storage tank, may also be employed in conjunction with the invention. Gas mixer 22 can be any conventional gas mixer which can be set to meter the appropriate gas from each gas source to establish the gas mixture useful with the present invention.

The shielding gas mixture useful with this invention is then passed through conduit means 6 to torch 2 and is passed through space 27 between contact tube 16 and torch cup 28 so that it forms a shroud for shielding arc 4 from the ambient atmosphere. Torch cup 28 preferably extends beyond the front end 17 of contact tube 16 so that the contact tube is recessed within the torch cup for a distance y. Preferably distance y is at least 5/32 inch.

Heretofore the ability to achieve high quality welds over a range of operating conditions and deposition rates in gas metal arc welding required a shielding gas mixture containing a high concentration of helium or the presence of oxygen in conjunction with helium, carbon dioxide and argon. The precisely defined shielding gas mixture of the process of this invention enables excellent gas metal arc welding utilizing spray arc transfer without using either an expensive mixture containing a high concentration of helium or a complex mixture which includes oxygen.

The invention will be further illustrated by the following examples which are not intended to be limiting.

EXAMPLE I

Automobile door openers of 14 guage plain carbon steel had been gas metal arc welded using a commercially available sheilding gas mixture comprising argon and carbon dioxide. The conventional welding operation took about 20 seconds.

The gas metal arc welding process of this invention using a shielding gas of 8 percent carbon dioxide, 25 percent helium and the balance argon was then used and the weld time was decreased to 13 seconds because higher deposition rates and weld travel speeds were achieved. Furthermore, the process of this invention provided better arc starting, flatter more consistent weld beads, and less spatter than the conventional process.

EXAMPLE II

Lawnmower sprockets and sheaves of a sintered alloy steel had been welded using a conventional gas metal arc process using a shielding gas employing oxygen. The process achieved unsatisfactory results on sintered parts or parts with oil on the surface. Weld quality was poor.

The gas metal arc welding process of this invention using a shielding gas similar to that used in Example I was then used. The resulting welds were much improved over those obtained by the conventional process and showed little or no porosity even on parts with oil on the surface.

EXAMPLE III

Large stainless steel bowls had been welded using a conventional gas metal arc process using a shielding gas comprised of 98 percent argon and 2 percent oxygen. The deposition rate was about 8 lbs/hr.

The gas metal arc welding process of this invention using a shielding gas similar to that used in Example I was then used. The deposition rate increased to 15 lbs/hr without a loss of weld quality, while overall welding costs were decreased significantly.

Now by the use of the process and gas mixture of the present invention, one can carry out gas metal arc welding in an improved manner. In particular one can carry out gas metal arc welding in the spray arc mode at a higher deposition rate than has been heretofore possible with other known gas metal arc welding methods, with less expense, and with better quality welds especially on oily substrates or those having other foreign matter such as mill scale on their surface. All this can be done over a wide range of welding conditions and can be done using the more desirable conventional spray type metal transfer.

Although the gas metal arc welding process of this invention has been described in detail with reference to certain specific embodiments, those skilled in the art will recognize that there are other embodiments of the invention within the scope and spirit of the claims.

We claim:

1. A process for gas metal arc welding with a consumable wire electrode comprising:
(a) forming an arc between said consumable wire electrode and a workpiece;

(b) maintaining a substantially constant arc voltage between said wire electrode and the workpiece;

(c) feeding the consumable wire electrode through a welding torch contact tube into said arc;

(d) transferring metal from the electrode to the workpiece; and (e) shielding the arc with a gas mixture consisting essentially of:

(A) 8 to 12 volume percent carbon dioxide;

(B) 20 to 45 volume percent helium;

(C) balance argon.

2. The process of claim 1 wherein the electrode has a diameter within the range of from 0.023 to 0.052 inch.

3. The process of claim 1 wherein the arc voltage is within the range of from 22 to 48 volts.

4. The process of claim 1 wherein the workpiece is comprised of carbon steel.

5. The process of claim 1 wherein the workpiece is comprised of alloy steel.

6. The process of claim 1 wherein the contact tube is maintained at a distance from the workpiece to enable an electrode extension of from 0.5 to 1.5 inches.

7. The process of claim 1 wherein the contact tube is recessed in the welding torch which has a torch cup extending beyond the front end of the contact tube.

8. The process of claim 7 wherein the said recess is at least 5/32 inch.

9. The process of claim 1 wherein the workpiece has some oil on the surface where the weld is intended.

10. The process of claim 1 wherein the workpiece has foreign matter such as mill scale on the surface where the weld is intended.

* * * * *